(12) United States Patent
La et al.

(10) Patent No.: US 7,719,645 B2
(45) Date of Patent: May 18, 2010

(54) OPTICALLY ANISOTROPIC BODY AND LIQUID CRYSTAL DISPLAY

(75) Inventors: Hung Trong La, Tokyo (JP); Shuhei Okude, Tokyo (JP)

(73) Assignee: Zeon Corporation, Tokyo (JP)

( * ) Notice: Subject to any disclaimer, the term of this patent is extended or adjusted under 35 U.S.C. 154(b) by 244 days.

(21) Appl. No.: 11/919,485

(22) PCT Filed: Apr. 28, 2006

(86) PCT No.: PCT/JP2006/308953

§ 371 (c)(1),
(2), (4) Date: Mar. 4, 2008

(87) PCT Pub. No.: WO2006/118234

PCT Pub. Date: Nov. 9, 2006

(65) Prior Publication Data

US 2009/0316094 A1 Dec. 24, 2009

(30) Foreign Application Priority Data

Apr. 28, 2005 (JP) ............................. 2005-133745
Aug. 26, 2005 (JP) ............................. 2005-246017

(51) Int. Cl.
*G02F 1/13363* (2006.01)
(52) U.S. Cl. ...................................... 349/117; 349/118
(58) Field of Classification Search .................. None
See application file for complete search history.

(56) References Cited

U.S. PATENT DOCUMENTS

| 5,184,236 A | * | 2/1993 | Miyashita et al. ............ 349/99 |
| 5,485,295 A | * | 1/1996 | Itoh et al. .................... 349/117 |
| 6,512,561 B1 | | 1/2003 | Terashita et al. |

FOREIGN PATENT DOCUMENTS

| JP | 2000-19518 A | 1/2000 |
| JP | 2003-177244 A | 6/2003 |
| JP | 2004-37837 A | 2/2004 |

* cited by examiner

*Primary Examiner*—Mike Stahl
(74) *Attorney, Agent, or Firm*—Birch, Stewart, Kolasch & Birch, LLP

(57) ABSTRACT

The present invention provides a liquid crystal display that prevents false colors and has a wide viewing angle, display screen contrast that does not decline, and excellent productivity. The liquid crystal display, comprising a liquid crystal cell, a sheet-shaped optically anisotropic body positioned on only one side of the liquid crystal cell, and a pair of light polarizers located on both sides of the liquid crystal cell, wherein the optically anisotropic body satisfies the relationship of $n_x > n_y > n_z$ at wavelength of 550 nm, where $n_x$ is in-plane refraction index of lag axis direction, $n_y$ is refraction index of the direction perpendicular to the lag axis in the plane, and $n_z$ is refraction index of the thickness direction; and has a local minimal value in wavelength range of 380 to 490 nm and monotonous increase in both the short wavelength and long wavelength directions from the wavelength that shows the local minimal value, in wavelength characteristics of frontal direction retardation for light in wavelength range of 380 to 780 nm.

12 Claims, 14 Drawing Sheets

[FIG.1]
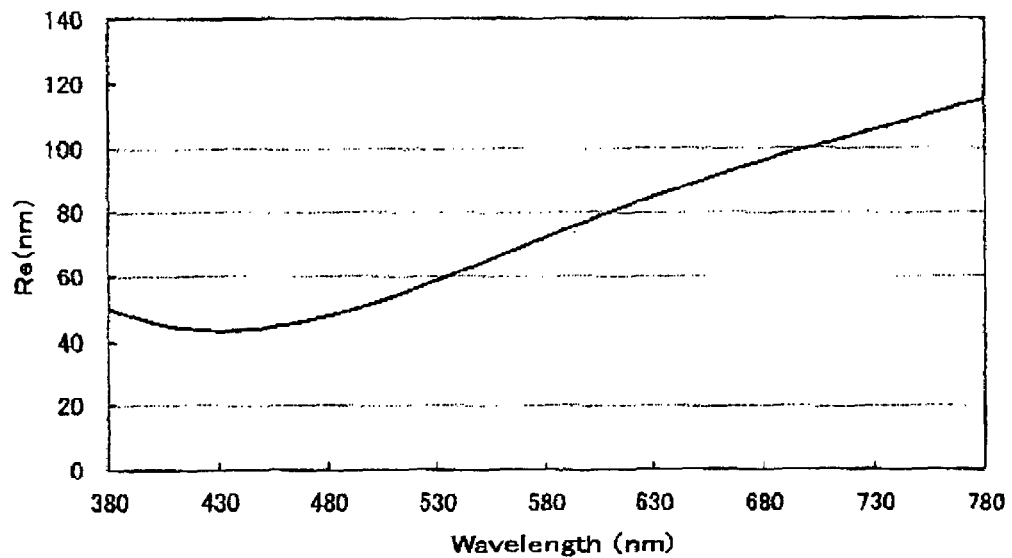
[FIG.2]
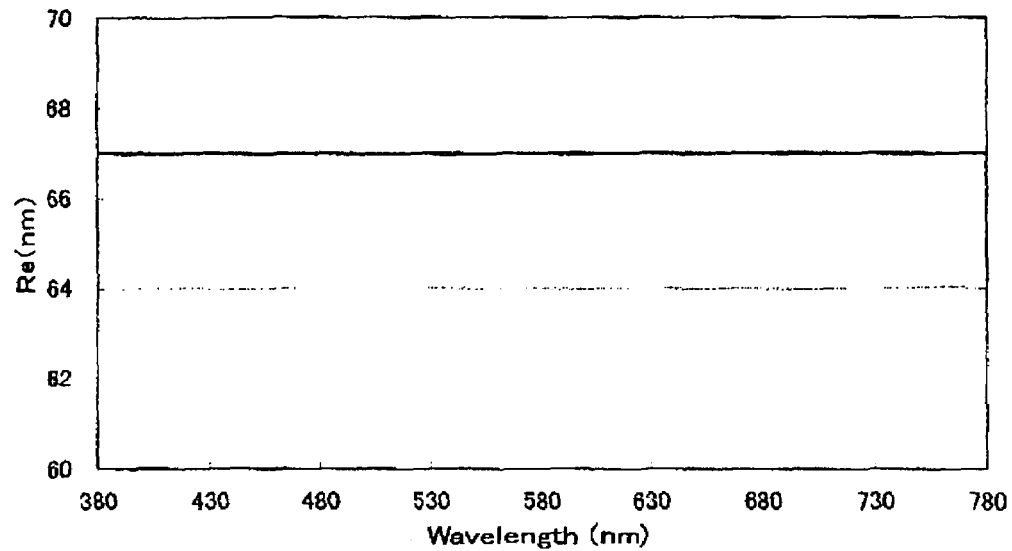

[FIG.3]
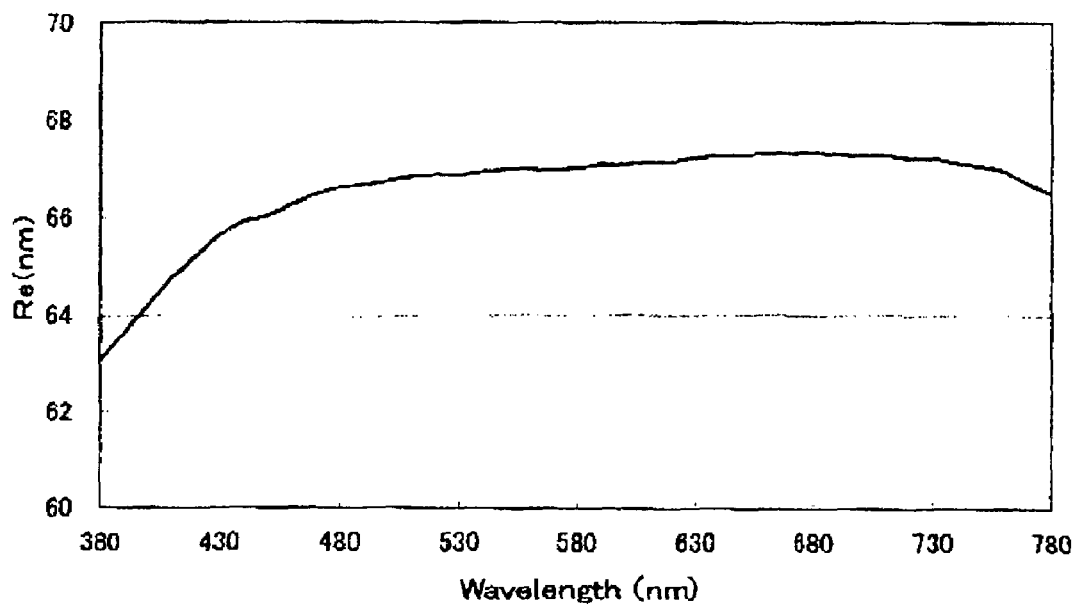
[FIG.4]
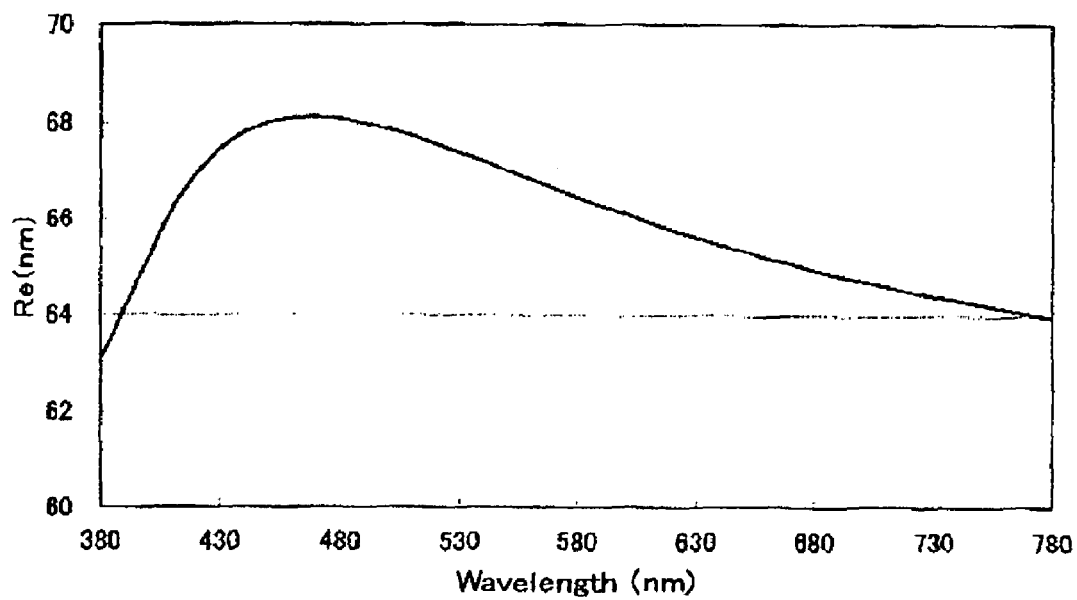

[FIG.5]
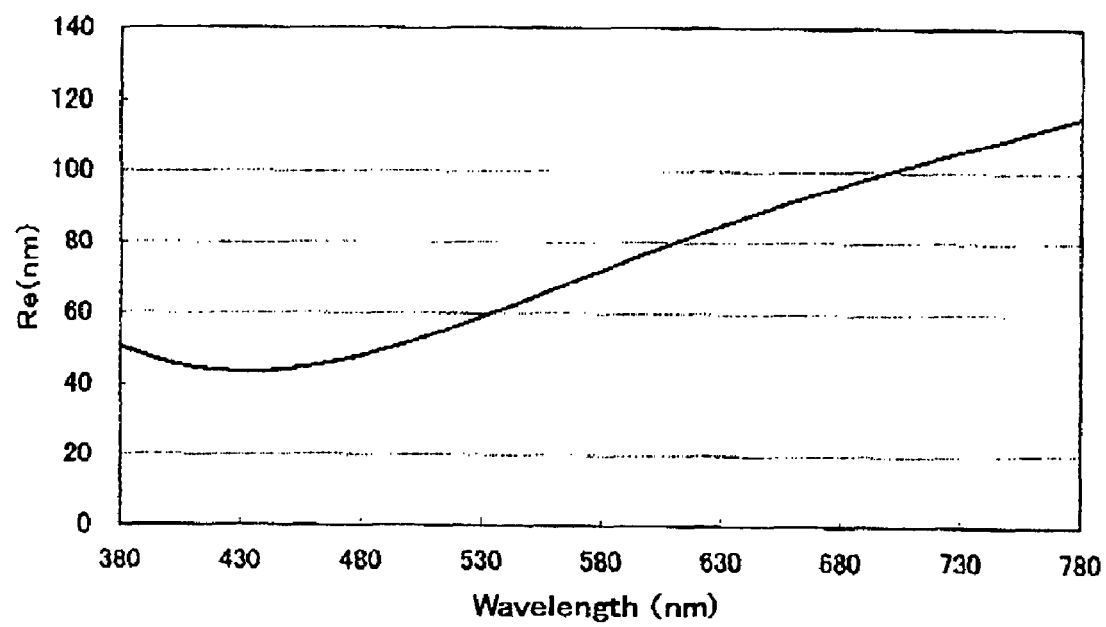

[FIG.6]
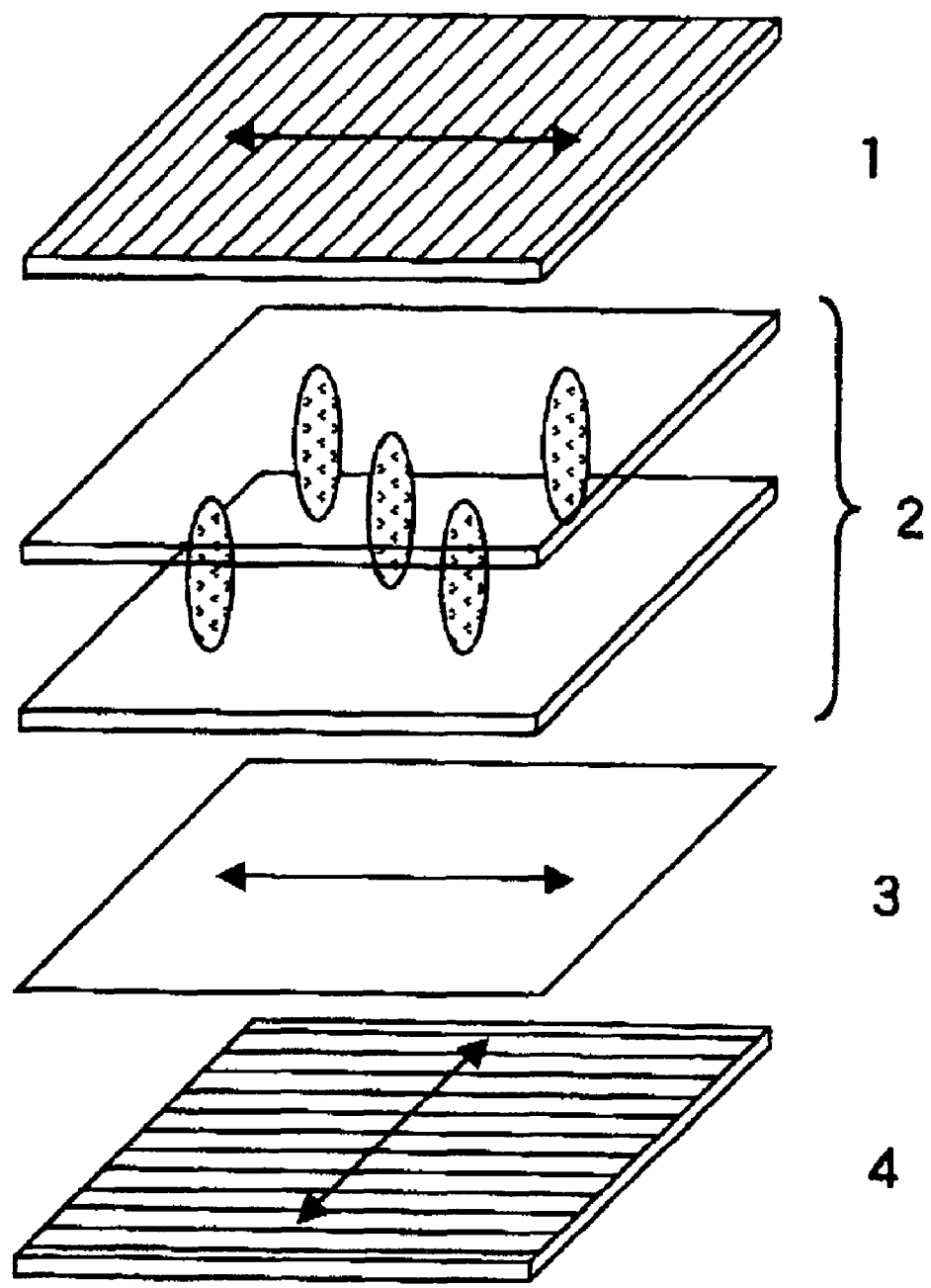

[FIG.7]
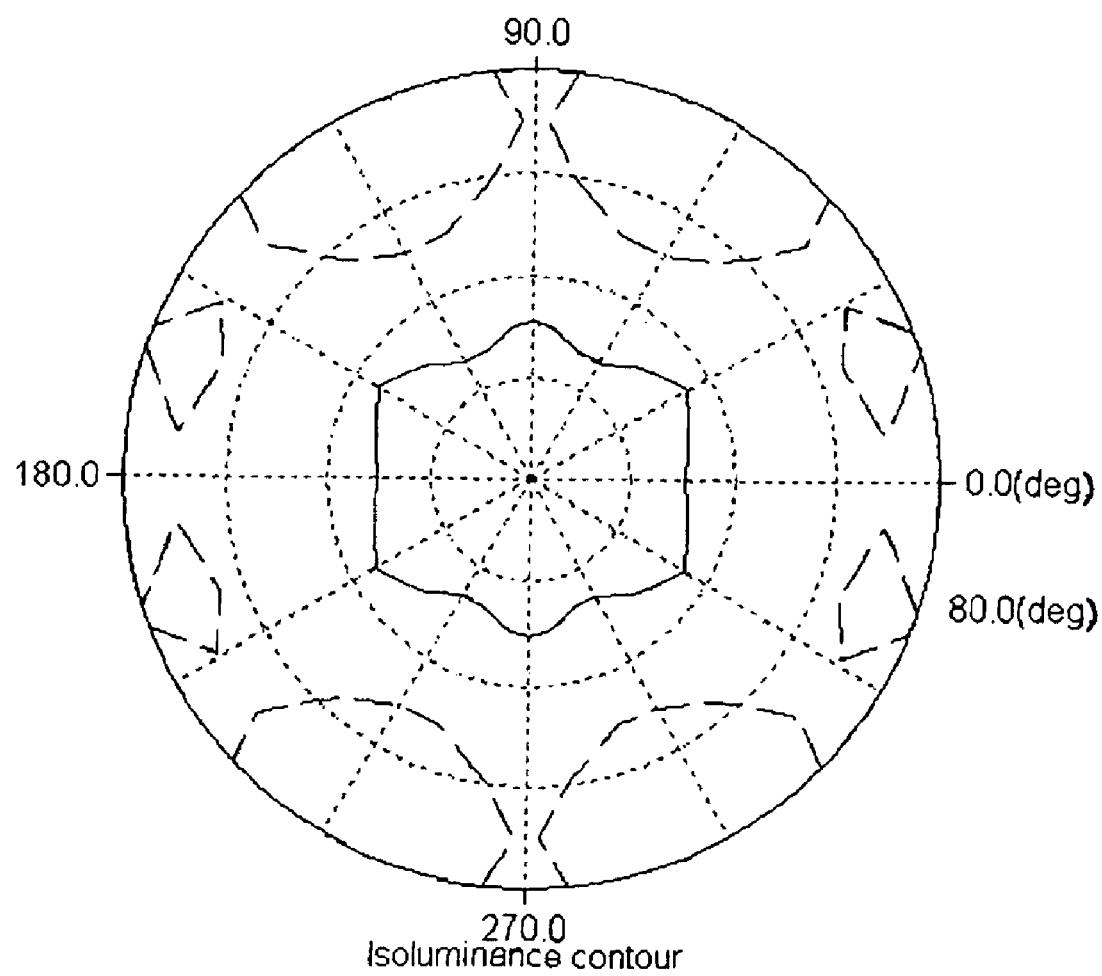

[FIG.8]
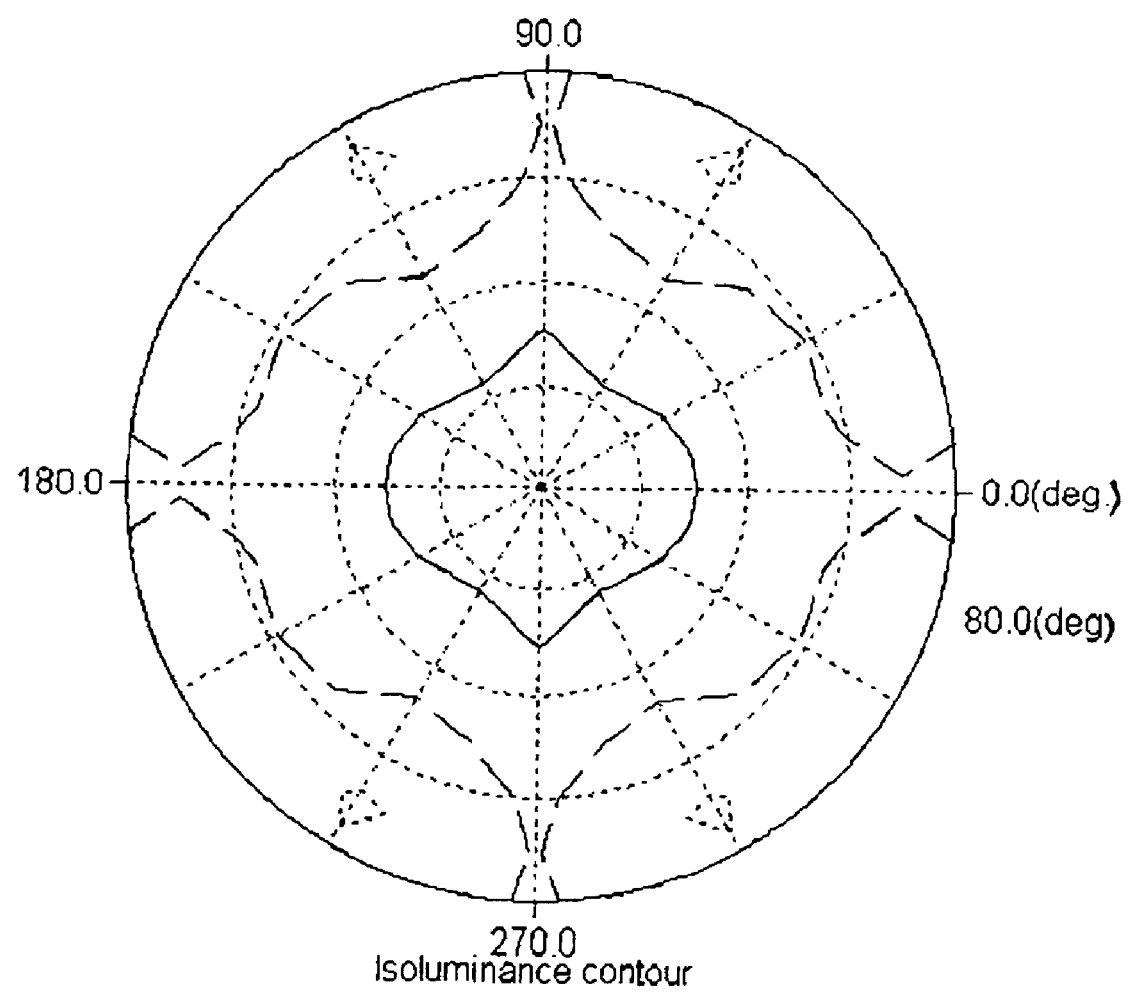

[FIG. 9]
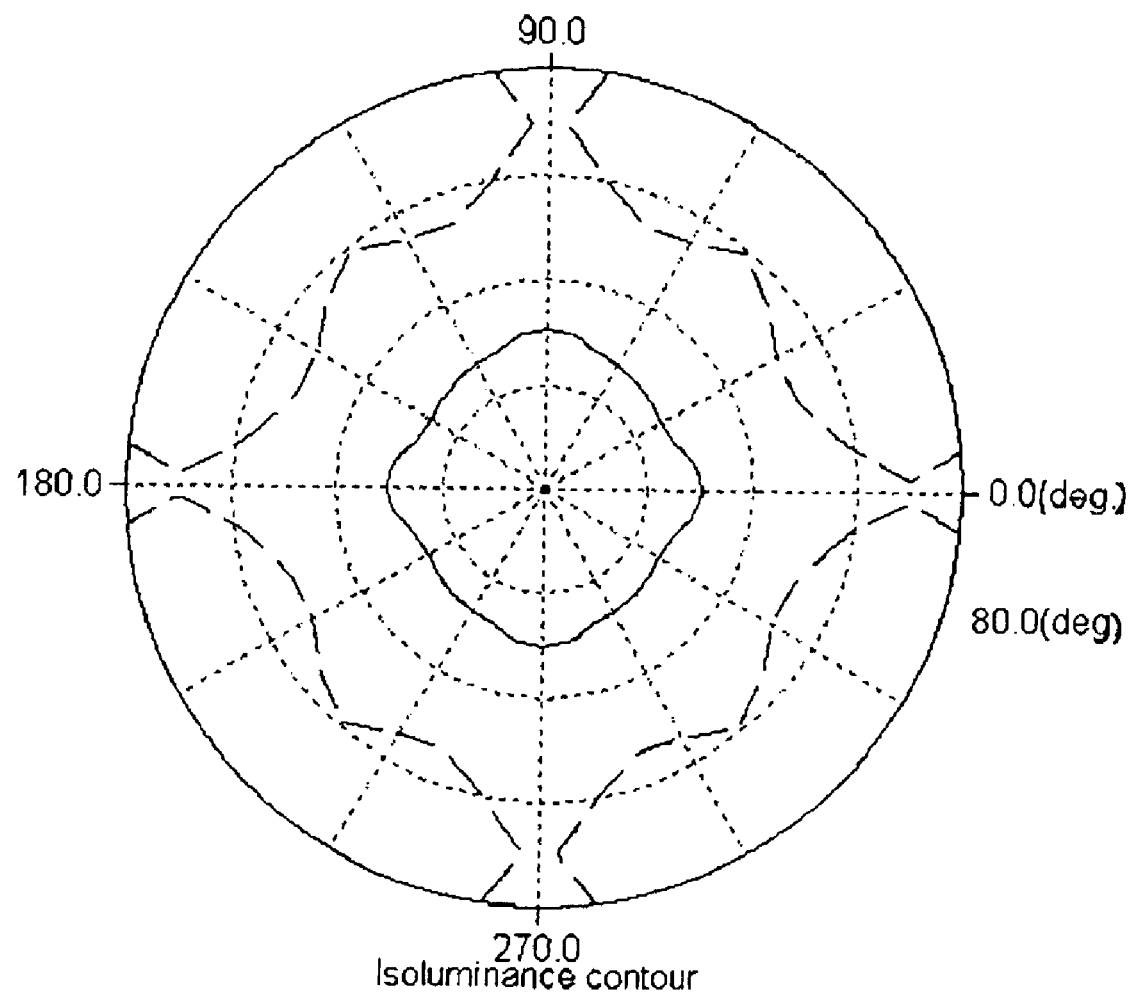

[FIG.10]
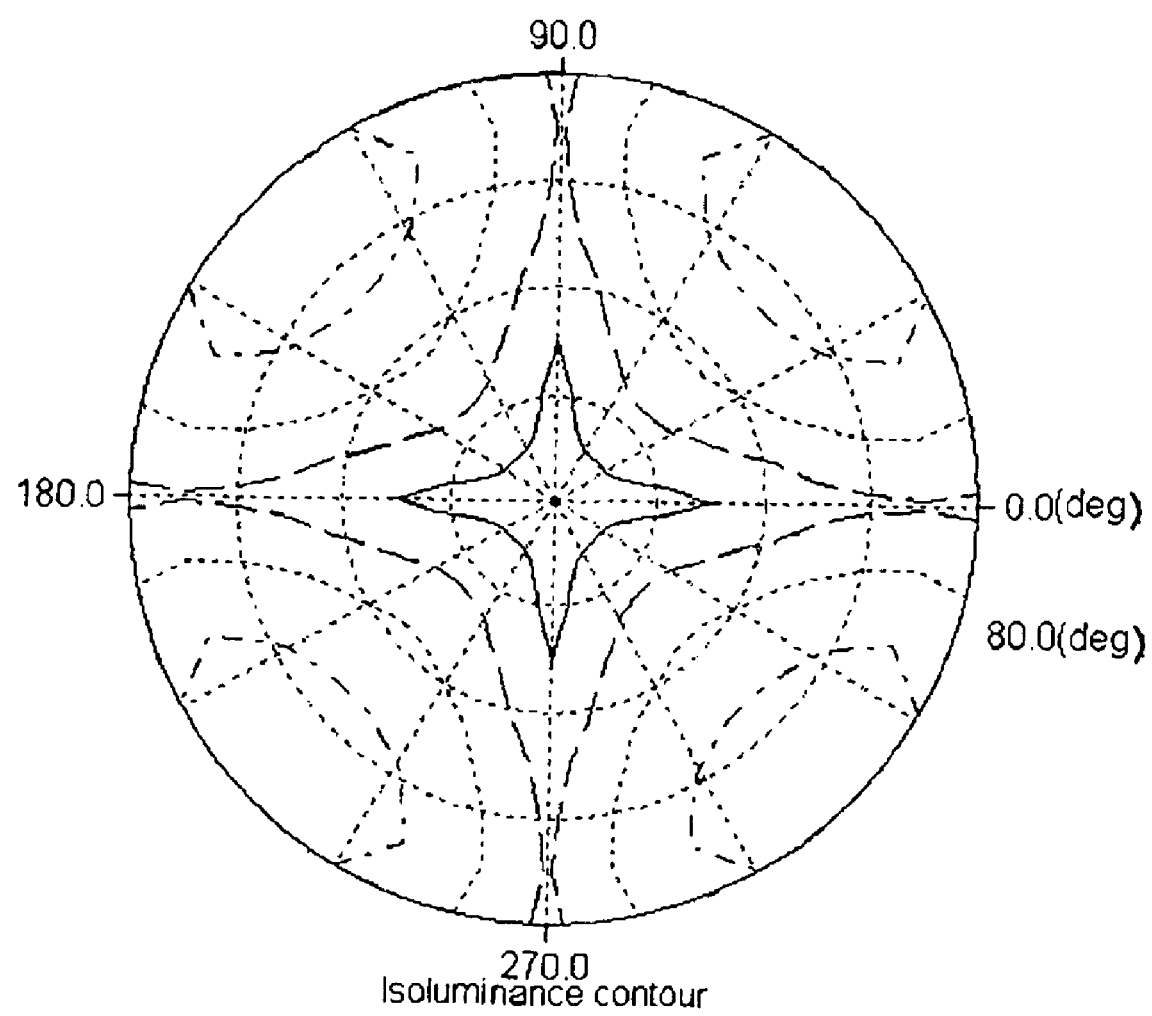

[FIG.11]
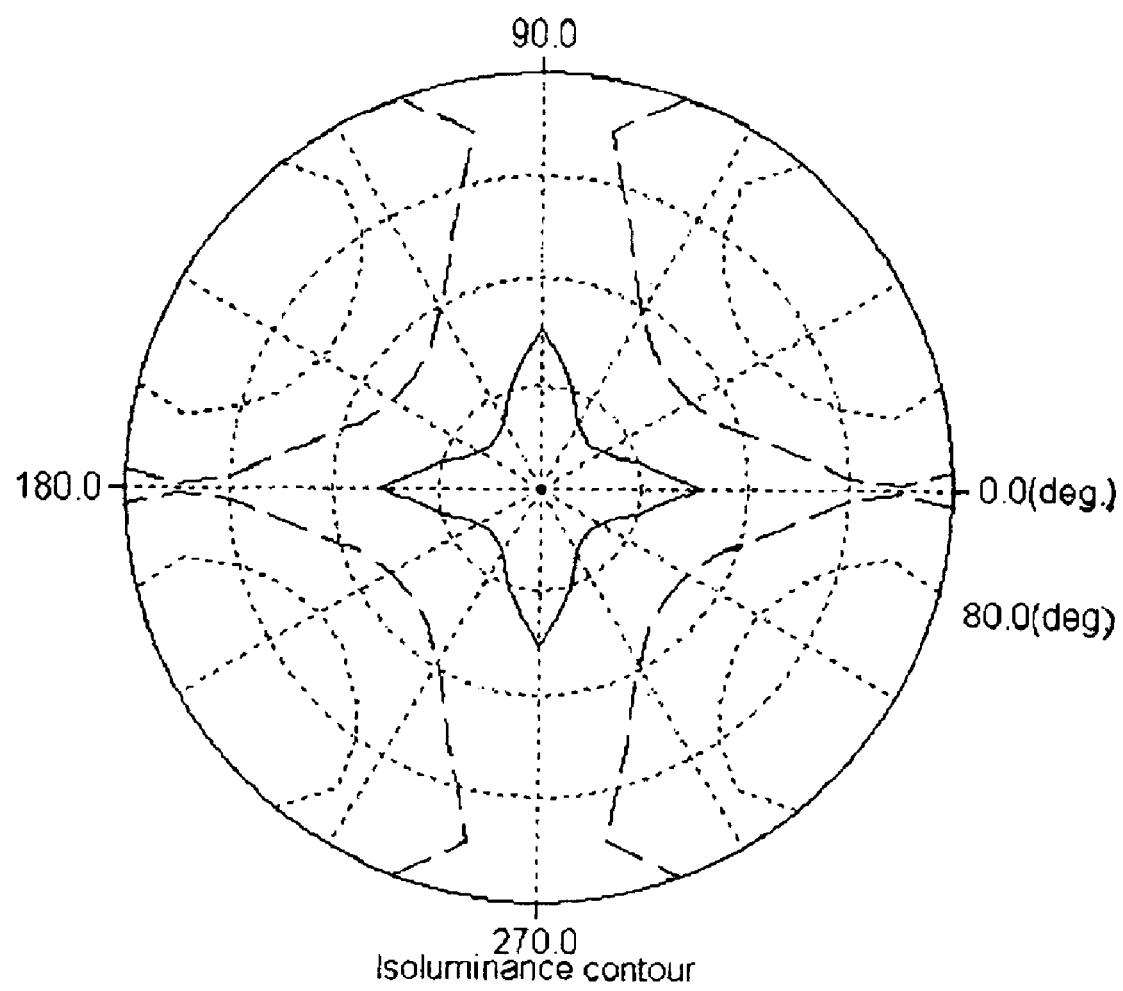

[FIG.12]
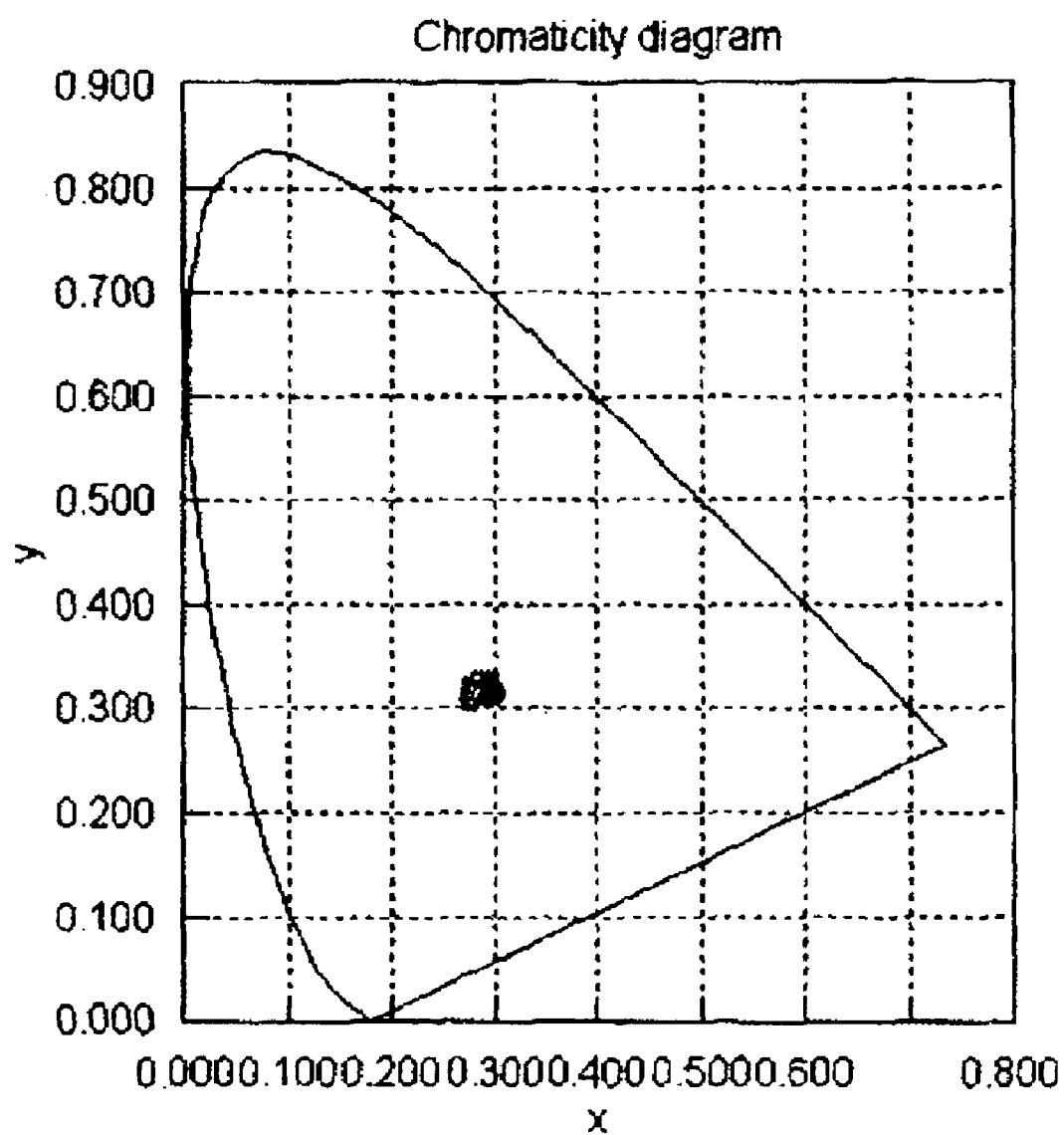

[FIG.13]
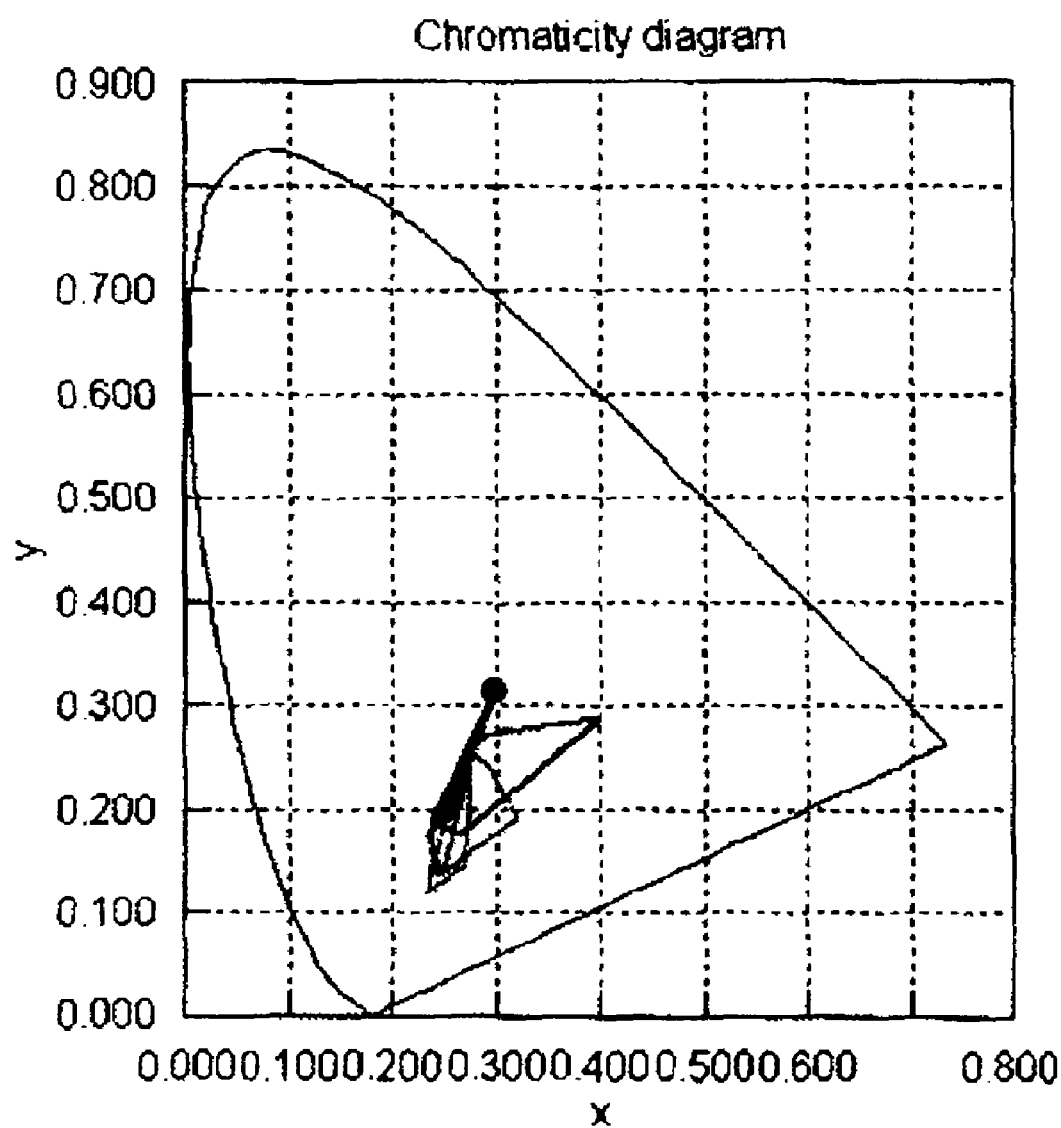

[FIG.14]
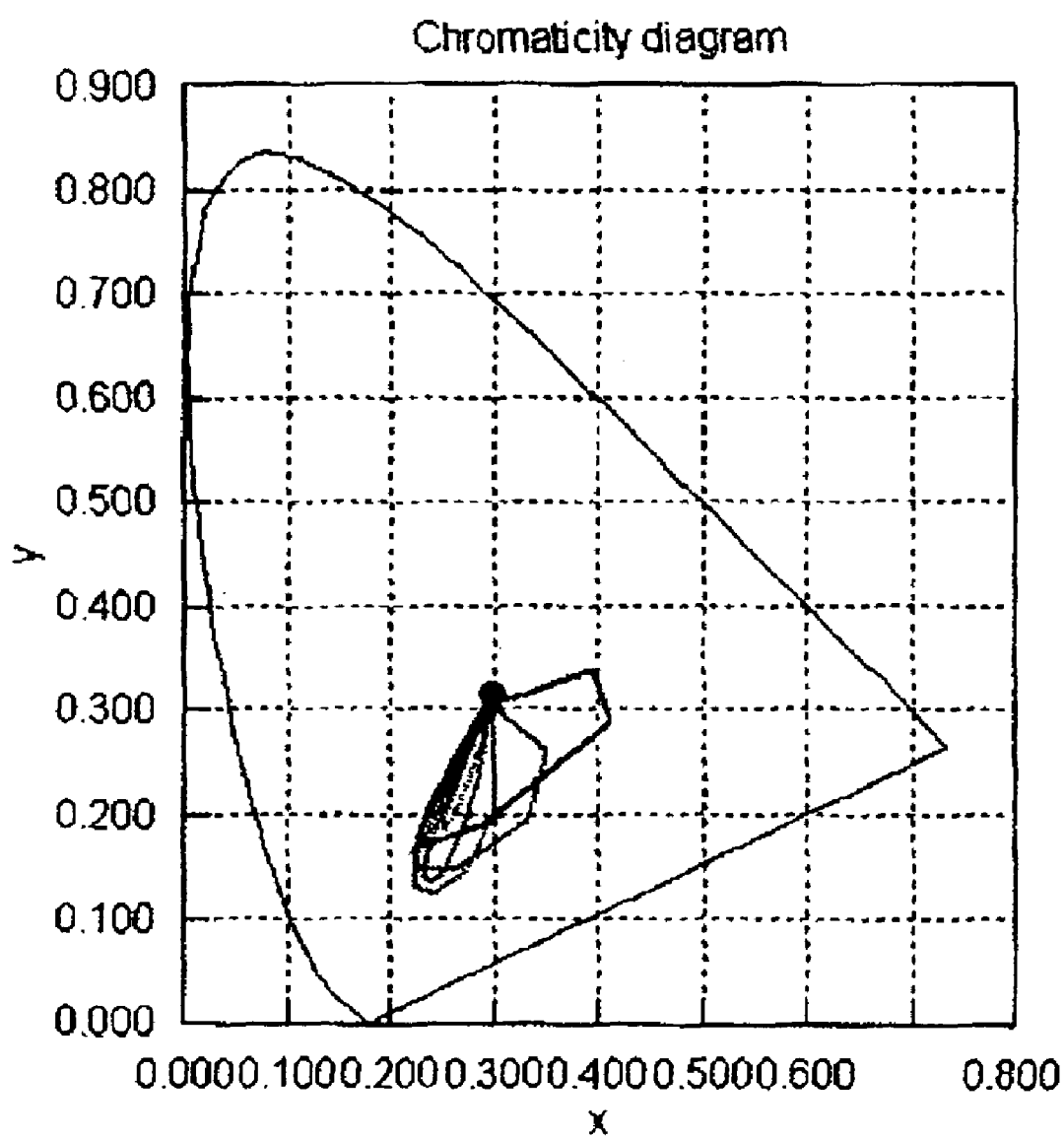

[FIG.15]
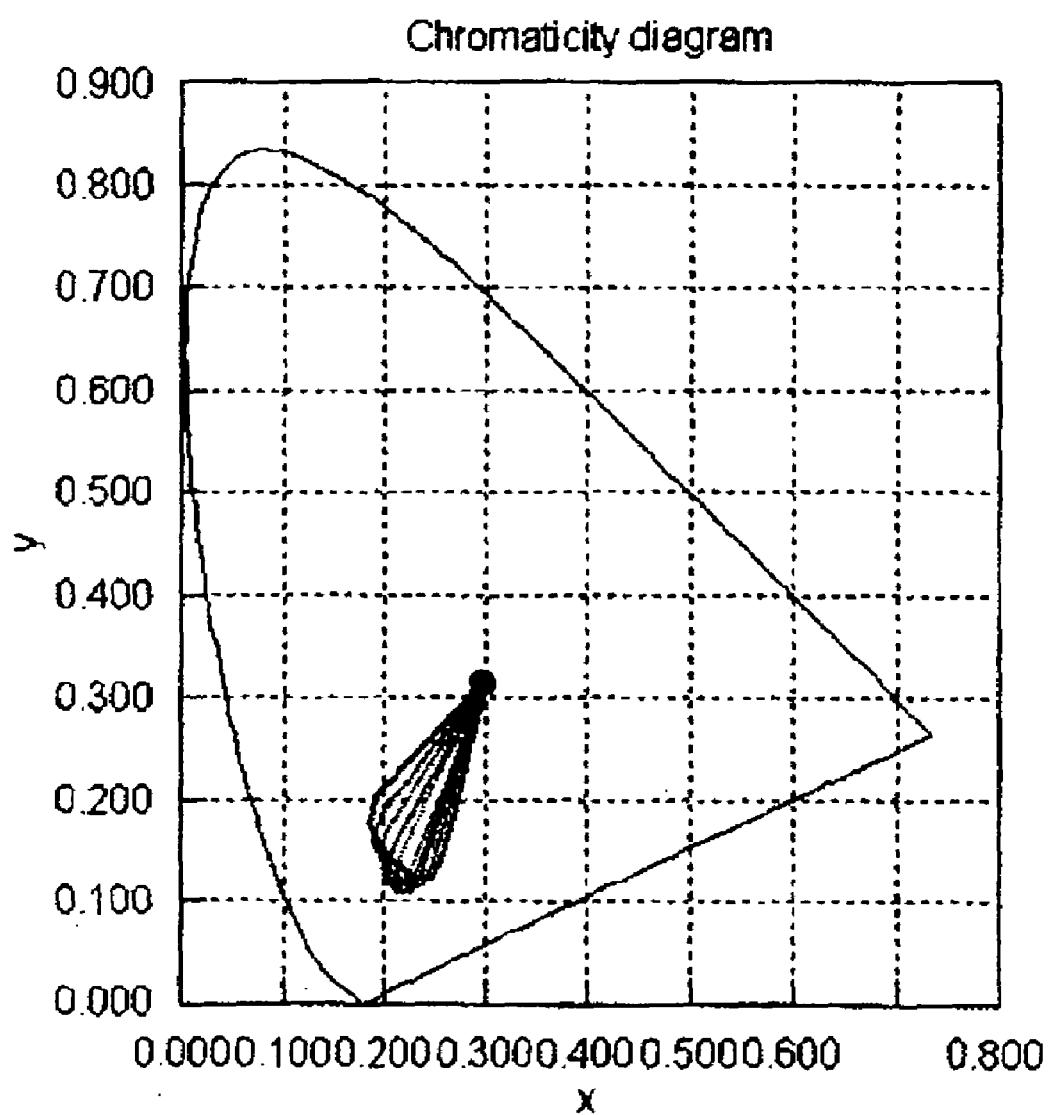

[FIG.16]
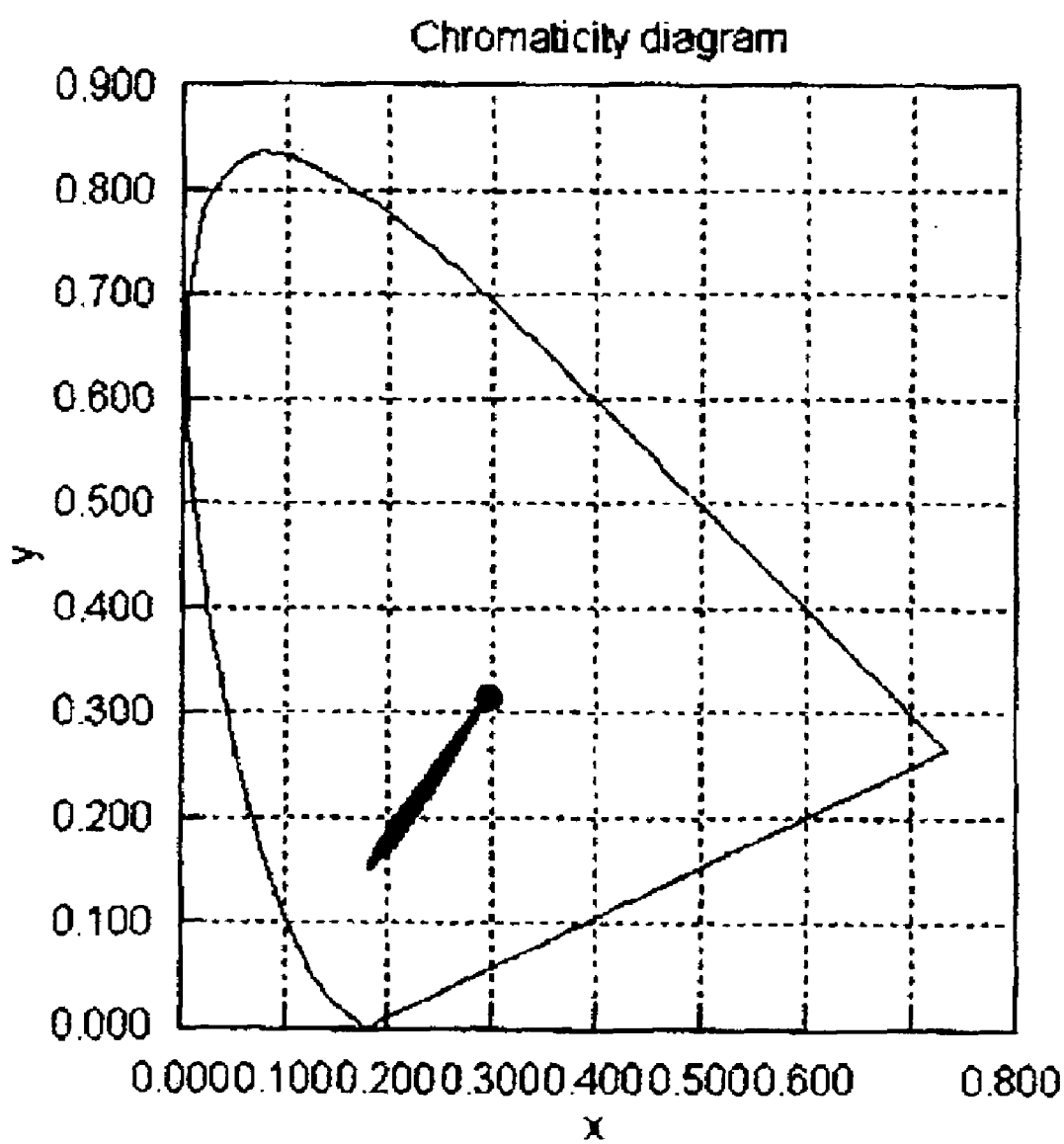

OPTICALLY ANISOTROPIC BODY AND LIQUID CRYSTAL DISPLAY

TECHNICAL FIELD

The present invention relates to an optically anisotropic body and liquid crystal display, and more specifically to a vertical alignment mode liquid crystal display with a display screen having a wide viewing angle, the display screen contrast does not drop, false colors are prevented, and productivity is excellent.

BACKGROUND ART

Liquid crystal display are classified according to the differences in the liquid crystal drive method (i.e. display mode) in the liquid crystal cell. One of these is the vertical alignment mode (hereinafter referred to as the "VA mode") liquid crystal display, which is currently the main method utilized for large displays. Further, making liquid crystal displays even large requires a wider viewing angle, so it is preferable for mitigating the screen contrast drop and false colors that occur when a display is viewed from a slant.

For the optically anisotropic body used in the liquid crystal display, patent reference 1 proposes a phase difference film composed of a single layer organic aligned film having at least 1 maximum value and/or minimum value of phase difference value (i.e. frontal direction retardation) in wavelength range of 400 nm to 800 nm. Additionally, patent reference 2 proposes a VA mode liquid crystal display comprising a phase difference film wherein the frontal direction retardation and the thickness direction retardation satisfy a specific relationship at wavelengths of 450 nm and 550 nm. Using the phase difference film described in patent references 1 or 2 in a VA mode liquid crystal display slightly improves the contrast when viewing a display from a slant. There remains a great degree of screen false color, however, so these efforts are still unsatisfactory.

The configuration having a piece of optically anisotropic body such as phase difference film placed on each of both sides of the liquid crystal cell is widely used in a VA mode liquid crystal display. This is because the allowable range for the phase difference value such as the frontal direction retardation required of the optically anisotropic body is relatively wide. In addition, increasing the regular allowable range of the optically anisotropic body phase difference value increases the optically anisotropic body yield and improves the liquid crystal display productivity.

However, if simplifying the production process of liquid crystal displays is taken into consideration, reducing the number of optically anisotropic bodies, specifically using an arrangement that employs only one piece of optically anisotropic body on one side of the liquid crystal cell is preferable. Employing a configuration wherein only one piece of conventional optically anisotropic body as described in patent references 1 or 2 is placed on only one side of the liquid crystal cell, however, results in a narrow allowable range of the phase difference value required in the optically anisotropic body. This is not a problem if an optically anisotropic body with a phase difference value that fits within this narrow allowable range can be produced in large quantities, but the current production method for the long and wide optically anisotropic bodies used in large displays cannot easily place the phase difference value completely within the allowable range and the optically anisotropic body yield is low, which is an obstacle to improving liquid crystal display productivity.

[Patent Reference 1] Japanese Patent Laid-open No. 2003-177244

[Patent Reference 2] Japanese Patent Laid-open No. 2004-037837

DISCLOSURE OF THE INVENTION

Problems to be Solved by the Invention

Therefore, an object of the present invention is to provide a liquid crystal display, more particularly a vertical alignment mode liquid crystal display, with a display screen having a wide viewing angle without a drop in display screen contrast or the occurrence of false colors, and that has excellent productivity.

Means to Solve the Problems

To achieve the above objectives the inventors focused on the backlight used in liquid crystal displays. The light intensity of the backlight peaks in the vicinity of wavelengths 435 nm, 545 nm, and 610 nm. The inventors focused their research on the behavior of optically anisotropic body frontal direction retardation value at these wavelengths of the light intensity peak, and at wavelength longer and shorter than the peak wavelength.

As a result, the inventors found they could obtain a liquid crystal display, and more particularly a vertical alignment mode liquid crystal display, with a display screen having a wide viewing angle without a drop in display screen contrast or the occurrence of false colors, and that has excellent productivity by using an optically anisotropic body having specific wavelength dispersion characteristics in which there is a frontal direction retardation minimum value in the vicinity of the 435 nm wavelength and the frontal direction retardation is increased in both the directions from the wavelength showing the minimum value to the long wavelength and to the short wavelength while satisfying the specified refraction index relationship. In addition, it was found that high yield production of the optically anisotropic body is possible, which in turn makes possible high productivity for liquid crystal displays, since a wide allowable range for the phase difference value as the frontal direction retardation, even a configuration that places one piece of this optically anisotropic body on the only one side of the liquid crystal cell.

Specifically, the present invention is as follows.

(1) A liquid crystal display comprising a liquid crystal cell, a sheet-shaped optically anisotropic body placed on one side of the liquid crystal cell, and a pair of light polarizers located on both sides of the liquid crystal cell, wherein the above-mentioned optically anisotropic body satisfies the relationship of $n_x > n_y > n_z$ at wavelength of 550 nm, where $n_x$ is in-plane refraction index of lag axis direction, $n_y$ is refraction index of the direction perpendicular to the lag axis in the plane, and $n_z$ is refraction index of the thickness direction, and has a local minimal value in wavelength range of 380 nm to 490 nm and monotonous increase in both the short wavelength and long wavelength directions from the wavelength that shows the local minimal value, in wavelength characteristics of frontal direction retardation for light in the wavelength range of 380 to 780 nm.

(2) The liquid crystal display described in (1) wherein the above-mentioned liquid crystal cell is a vertical alignment mode.

(3) The liquid crystal display described in (1) or (2) wherein the above-mentioned optically anisotropic body is manufactured by drawing a flat shaped body comprising thermoplastic resin.

(4) The liquid crystal display described in any one of (1) to (3) wherein the above-mentioned optically anisotropic body has an average value of 40 to 100 nm in a frontal direction retardation for light at wavelength of 550 nm.

(5) The liquid crystal display described in any one of (1) to (4) wherein the above-mentioned optically anisotropic body has an average value of 100 to 400 nm in a thickness direction retardation for light at wavelength of 550 nm.

(6) The liquid crystal display described in any one of (1) to (5) wherein the above-mentioned optically anisotropic body has coefficient NZ of 2 to 8 for light at wavelength of 550 nm.

(7) The liquid crystal display described in any one of (1) to (6) wherein the above-mentioned optically anisotropic body made of material containing retardation adjustor.

(8) The liquid crystal display described in any one of (1) to (7) wherein the above-mentioned optically anisotropic body is manufactured by drawing of a layered body which has a layer comprising as a main ingredient thermoplastic resin having a positive intrinsic birefringence value and a layer comprising as a main ingredient thermoplastic resin having a negative intrinsic birefringence value.

(9) The liquid crystal display described in any one of (1) to (8) wherein the above-mentioned optically anisotropic body is placed between the light polarizer on the incident side and the liquid crystal cell.

(10) The liquid crystal display described in any one of (1) to (9) wherein the lag axis in the plane of the above-mentioned optically anisotropic body and the absorption axis of the light polarizer placed in the vicinity of the optically anisotropic body are in a positional relationship that is nearly perpendicular.

(11) The liquid crystal display described in any of (1) to (10) that is a transparent.

(12) An optically anisotropic body which satisfies the relationship of $n_x > n_y > n_z$ for a wavelength of 550 nm, where $n_x$ is in-plane refraction index of lag axis direction, $n_y$ is refraction index of the direction perpendicular to the lag axis in the plane, and $n_z$ is refraction index of the thickness direction, and has a local minimal value in wavelength range of 380 nm to 490 nm and monotonous increase in both the short wavelength and long wavelength directions from the wavelength that shows the local minimal value, in wavelength characteristics of frontal direction retardation for light in the wavelength range of 380 to 780 nm.

Effects of the Invention

The liquid crystal display in the present invention is provided with an optically anisotropic body of the present invention on only one side of the liquid crystal cell to make it possible to increase the viewing angle and to prevent a drop in contrast and false colors.

In addition, the optically anisotropic body used in the liquid crystal display in the present invention has a wider allowable range for the required retardation in the frontal direction than previous optically anisotropic bodies, which improves the overall productivity of liquid crystal displays in the present invention.

BRIEF DESCRIPTION OF THE DRAWINGS

FIG. 1 is a graph showing the relationship between the Re of an optically anisotropic body A1 in the present invention and the measured wavelength.

FIG. 2 is a graph showing the relationship between the Re of an optically anisotropic body B1 and the measured wavelength.

FIG. 3 is a graph showing the relationship between the Re of an optically anisotropic body B2 and the measured wavelength.

FIG. 4 is a graph showing the relationship between the Re of an optically anisotropic body B3 and the measured wavelength.

FIG. 5 is a graph showing the relationship between the Re of an optically anisotropic body B4 and the measured wavelength.

FIG. 6 is an illustration showing the configuration of a liquid crystal display A1 in the present invention and liquid crystal displays B1 to B4.

FIG. 7 is a contour graph for the liquid crystal display A1 in the present invention.

FIG. 8 is a contour graph for the liquid crystal display B1.
FIG. 9 is a contour graph for the liquid crystal display B2.
FIG. 10 is a contour graph for the liquid crystal display B3.
FIG. 11 is a contour graph for the liquid crystal display B4.
FIG. 12 is an xy chromaticity diagram for the liquid crystal display A1 in the present invention.
FIG. 13 is an xy chromaticity diagram for the liquid crystal display B1.
FIG. 14 is an xy chromaticity diagram for the liquid crystal display B2.
FIG. 15 is an xy chromaticity diagram for the liquid crystal display B3.
FIG. 16 is an xy chromaticity diagram for the liquid crystal display B4.

EXPLANATION OF SYMBOLS

1: Outgoing side light polarizer
2: Liquid crystal cell
3: Optically anisotropic body
4: Incident side light polarizer affixed on one side with triacetyl cellulose film

BEST MODE FOR CARRYING OUT THE INVENTION

The optically anisotropic body used in the liquid crystal display of the present invention satisfies the relationship of $n_x > n_y > n_z$ where, for a wavelength of 550 nm, $n_x$ is refraction index of lag axis direction in the plane, $n_y$ is refraction index of the direction perpendicular to the lag axis in the plane, and $n_z$ is refraction index of the thickness direction. If the relationship of $n_x > n_y > n_z$ is not satisfied, the screen contrast of the liquid crystal display in the present invention will drop and screen false colors will be generated, which greatly lowers the visibility of the screen. In addition, the production yield of the above-mentioned optically anisotropic body is lowered and the overall productivity of the liquid crystal display of the present invention declines.

Note that the contrast (CR) in the present invention denotes the ratio ($Y_{ON}/Y_{OFF}$) of the luminance $Y_{ON}$ when the liquid crystal display is lit to the luminance $Y_{OFF}$ when the liquid crystal display is off. This shows that the larger the contrast, the better the visibility. Here, when the display is lit means when the liquid crystal display is at its maximum brightness, and when the display is off means when the display is at its darkest.

The optically anisotropic body used in the present invention has a local minimal value in the wavelength range of 380 to 490 nm, preferably in the wavelength range of 400 to 470 nm, and more preferably in the wavelength range of 425 to 445 nm and has monotonous increase in both the short wavelength and long wavelength directions from the wavelength that shows the local minimal value of the Re for light in the wavelength range of 380 to 780 nm, in frontal direction retardation (Re) wavelength characteristics. Note that Re is the value expressed by $Re=(n_x-n_y) \times d$ where d is the thickness of the optically anisotropic body.

Using an optically anisotropic body having these kinds of wavelength characteristics and the above-mentioned refraction index relationship improves screen visibility without causing a drop in screen contrast while at the same time suppressing the generation of screen false colors. In addition, the production yield of the above-mentioned optically anisotropic body is increased and the overall productivity of the liquid crystal display of the present invention rises.

The Re average value of the above-mentioned optically anisotropic body for 550 nm wavelength light is preferably 20 nm or more, more preferably 40 to 100 nm, even more preferably 40 to 80 nm, and particularly preferably 50 to 70 nm. If the Re average value for 550 nm wavelength light is outside of this range, the liquid crystal display screen contrast could markedly drop or false colors could be generated. If the Re average value for 550 nm wavelength light is inside of this range, in the liquid crystal display, particularly a VA mode liquid crystal display, viewing angle compensation for the after-mentioned light polarizer can be effectively performed. Here, the Re average value is the average value of the Re measurements at equal intervals along the width of the film.

The Re variance of the above-mentioned optically anisotropic body for 550 nm wavelength light is preferably within 10 nm, more preferably within 5 nm, and particularly preferable within 2 nm. Restricting the Re variance to within the above range can provide good display quality when used for displays. Here, the Re variance is the difference between the Re maximum value and Re minimum value measured along the width of the film.

The above-mentioned optically anisotropic body is preferably 100 to 400 nm, and more preferably 150 to 300 nm in an average value of the thickness direction retardation (Rth) for light with a wavelength of 550 nm. If the Rth average value for 550 nm wavelength light is outside of this range, the liquid crystal display screen contrast could drop or false colors could occur when the display is viewed from a slant. If the Re average value for 550 nm wavelength light is inside of this range, in the liquid crystal display, particularly a VA mode liquid crystal display, viewing angle compensation for the after-mentioned light polarizer and compensation of phase difference generated by the liquid crystal in the liquid crystal cell can be effectively performed. Note that Rth is the value expressed by $Rth=(((n_x+n_y)/2)-n_z) \times d$. In addition, the Rth average value is the average value of the Rth measurements at equal intervals along the width of the film.

The Rth variance of the above-mentioned optically anisotropic body for 550 nm wavelength light is normally within 10 nm, preferably within 5 nm, and more preferably within 2 nm. Restricting the Rth variance to within the above range can provide good display quality when used for displays. Here, the Rth variance is the difference between the Rth maximum value and Rth minimum value measured along the width of the film.

The above-mentioned optically anisotropic body has a sheet shape. Taking into consideration mechanical strength and other factors, the average thickness of the above-mentioned optically anisotropic body is preferably 20 to 200 μm, more preferably 30 to 120 μm, and particularly preferably 40 to 80 μm.

The coefficient NZ of the above-mentioned optically anisotropic body for 550 nm wavelength light is preferably 1.2 to 10, more preferably 2 to 8, and particularly preferably 3 to 6. If the coefficient NZ is outside of this range, the liquid crystal display screen contrast could drop or false colors could occur when the display is viewed from a slant. Note that coefficient NZ is the value expressed by $(n_x-n_z)/(n_x-n_y)$.

The material for making the optically anisotropic body used in the liquid crystal display of the present invention is not limited in particular as long as it is transparent to light, but is thermoplastic resins preferably. Thermoplastic resins can be largely divided into resins with a positive intrinsic birefringence value and those with a negative intrinsic birefringence value.

Mentioned as resins having a positive intrinsic birefringence value can be polyolefin resins such as polyethylene, polycarbonate resins, polyvinyl alcohol resins, polyvinyl chloride resins, polyamide resins, polysulfon resins, polyether sulfon resins, polyarylate resins, cellulose ester resins such as cellulose triacetate, polyester resins such as polyethylene terephthalate, acrylic resins such as polymethylmethacrylate, alicyclic polyolefin resins and so on.

Mentioned as resins having a negative intrinsic birefringence value can be polystyrene resins, polyacrylonitrile resins, acrylic resins such as polymethylmethacrylate, polycarbonate resins, cellulose ester resins and so on. In addition, copolymers of the monomers used to manufacture the above resins or mixtures of these resins may be employed.

In these, preferable are cellulose ester resins, alicyclic polyolefin resins, and polystyrene resins.

Cellulose ester resins are resins that the monomer is cellulose ester or derivative, preferably low grade (6 or less carbon atoms is preferable) fatty acid cellulose ester, specifically preferably cellulose triacetate. An average acetylation degree of cellulose acetate is preferably 55 to 62%.

Alicyclic polyolefin resins are amorphous polyolefin resins having an alicyclic structure in the principle chain and/or lateral chain, preferably polyolefin resins having alicyclic structure in the principle chain from the viewpoint of improving durability such as minimizing change over time to frontal direction retardation and thickness direction retardation of the optically anisotropic body and stabilizing the homogeneous display.

Possible alicyclic structures include saturated alicyclic hydrocarbons (cycloalkane) structures and unsaturated alicyclic hydrocarbons (cycloalkene) structures. In consideration of mechanical strength, heat resistance and other factors, cycloalkane structure or cycloalkene structure is preferable, in these, cycloalkane structure is the most preferable. There are no specific restrictions to the number of carbon atoms composing an alicyclic structure, but when the range is normally 4 to 30, preferably 5 to 20, and more preferably 5 to 15, a good balance among mechanical strength, heat resistance, and film formability can be obtained, so this is preferable. The ratio of repeat units having alicyclic structure which compose the alicyclic polyolefin resin used in the present invention, can be suitably selected to satisfy the application objective, but is preferably at least 55% by weight, more preferably at least 70% by weight, and particularly preferably at least 90% by weight. When ratio of repeat units having alicyclic structure which compose the alicyclic polyolefin resin is within this range, the transparency and formability are good.

Alicyclic polyolefin resins include, for instance, norbornene based resins, monocyclic cyclo-olefin resins, cyclic conjugated diene based resins, vinyl alicyclic hydrocarbon based resins, and hydride thereof. In these, norbornene based resins can be preferably employed because they improve durability of the optically anisotropic body.

Mentioned as norbornene based resins are ring-opening polymers of monomers having norbornene structure, ring-opening copolymers of monomers having norbornene structure and other monomers, and hydride of the ring-opening (co)polymers; addition polymers of monomers having norbornene structure, addition copolymers of monomers having norbornene structure and other monomers, and hydride of the addition (co)polymers and so on. In these, hydrides of the ring-opening (co-)polymer of monomers having norbornene structure may be especially preferably employed from viewpoint of transparency, formability, heat resistance, low hygroscopicity, dimensional stability, lightweight property and so on.

The molecular weight of alicyclic polyolefin resins can be suitably selected, the converted weight-average molecular weight (Mw) of polyisoprene (polystyrene when toluene is used as solvent) measured with gel permeation chromatography using cyclohexane (toluene when the polymer resin is not dissolved) as the solvent is normally 5,000 to 500,000, preferably 10,000 to 100,000, and more preferably 18,000 to 55,000. The glass transition temperature of norbornene based resins is preferably 120 to 160° C. and more preferably 130 to 150° C.

Polystyrene resins are resins where the monomer is styrene or the derivatives. Mentioned are, for example, polystyrene; or copolymers of styrene monomers such as styrene, α-methylstyrene, o-methylstyrene, p-methylstyrene, p-chlorostyrene, p-nitrostyrene, p-aminostyrene, p-carboxystyrene and p-phenylstyrene, and other monomers such as ethylene, propylene, butadiene, isoprene, (meth)acrylonitrile, α-chloroacrylonitrile, methyl (meth)acrylate, ethyl (meth)acrylate, (meth)acrylic acid, maleic anhydride and vinyl acetate. In these, polystyrene or copolymer of styrene and maleic anhydride can be preferably employed. Here, (meth)acryl- means acryl- or methacryl-.

The molecular weight of polystyrene resins can be suitably selected. The converted weight-average molecular weight (Mw) of polyisoprene (polystyrene when toluene is used as solvent) measured with gel permeation chromatography using cyclohexane (toluene when the polymer resin is not dissolved) as the solvent is normally 10,000 to 300,000, preferably 15,000 to 250,000, and more preferably 20,000 to 200,000. The polystyrene resin used in the present invention is preferably at least 120° C., more preferably 120 to 200° C., and even more preferably 120 to 140° C. in glass transition temperature.

It is preferable that the material for making the above-mentioned optical anisotropic body contains a retardation adjuster to efficiently obtain an optical anisotropic body having the above-mentioned wavelength dispersion characteristics and refraction index relationship. The retardation adjuster is able to raise or lower the optically anisotropic body retardation depending on the additive amount.

Drawing materials containing the retardation adjuster, in particular the retardation adjuster exhibiting dichroism, results in the long axis of the retardation adjuster molecule orientated in the drawing direction. This orientation changes light absorbency in the drawing direction and the direction perpendicular to it. Further, as is known from the Kramers-Kronig's relation, refraction index in the vicinity of the light's maximum absorption wavelength range changes greatly depending on the orientation, so the refraction index changes greatly in the drawing direction and the direction perpendicular to it.

For example, drawing a film composed of material which comprises retardation adjuster exhibiting dichroism and being 350 nm in maximum absorption wavelength and a thermoplastic resin having a positive intrinsic birefringence value will increase the refraction index only in the drawing direction for light of a wavelength in the vicinity of 350 nm which is the maximum absorption wavelength of the retardation adjuster, which will increase the difference (Δn) from the refraction index in the direction perpendicular to the drawing direction. As a result, this causes retardation defined by Δn×D to become larger (Note that D shows the thickness of the film). As described above, using material that contains retardation adjuster makes it possible to adjust retardation for light of given wavelength.

As the retardation adjuster, as long as it is capable of raising and lowering retardation of the optically anisotropic body, either an organic compound or inorganic compound can be used. It is preferable that an organic compound can be used. The retardation adjusters composed of organic compound include ultraviolet light absorption agents, infra-red absorption agents, retardation elevators described in International Patent Publication WO00/65384, and so on. In these, ultraviolet absorption agents are preferable. Further, it is also preferable that the retardation adjuster possesses aromatic rings, substantially does not absorb light in visible region, has maximum absorption wavelength in the range of 250 nm to 450 nm or 700 nm to 1100 nm, or exhibits dichroism differed in the light absorption for long axis and short axis in the molecule.

Mentioned as ultraviolet light absorption agents can be salicylic acid ultraviolet absorption agents such as phenyl salicylate, p-tert-butyl phenyl salicylate, and p-octyl phenyl salicylate; benzophenone ultraviolet light absorption agents such as 2,4-dihydroxyl benzophenone; benzotriazole ultraviolet light absorption agents such as 2-(2'-hydroxy-5'-methylphenyl) benzotriazole, 2-(2'-hydroxy-3',5'-di-tert-amylphenyl) benzotriazole, and 2,2-methylenebis (4-(1,1,3,3-tetramethylbutyl)-6-(2H-benzotriazole-2-yl) phenol); and anilide ultraviolet absorption agents. In these, the benzotriazole ultraviolet light absorption agents are preferable.

Mentioned as infra-red light absorption agents can be organic dye compounds such as polymethine dye, squarylium dye, thiol-nickel complex, triarylmethane dye, immonium dye, diimmonium dye, and anthraquinone dye; and inorganic dye compounds such as aluminum salts and so on. For example, the immonium dye shown in Chemical 1 can be mentioned as preferable infrared light absorption agent

[Chemical 1]

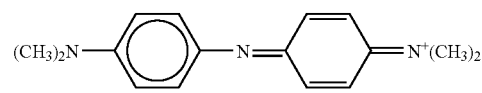

The retardation adjuster composition ratio in the materials for making the optically anisotropic body is normally 0.05 to 20% by weight and preferably 0.1 to 10% by weight, and may be selected from the above-stated range depending on the material type and the retardation adjuster type.

The material for making the above-mentioned optically anisotropic body may further contain heretofore known additives such as antioxidants, thermal stabilizers, light stabilizers, bluing agents and so on, as long as they do not hinder the effect of the invention.

The above-mentioned optically anisotropic body is not restricted by method of manufacture, normally may be obtained by molding the above-mentioned material and drawing it.

Method of molding the above-mentioned material include solution film fabrication, co-solution flow casting, extrusion molding, co-extrusion molding and so on. Solution fabrication and co-solution flow casting are also called solution casting, for example, which is the method comprising steps of dissolving the material in an organic solvent to prepare an embrocation (also called coating solution), applying the embrocation onto a support, and then drying the organic solvent to make a sheet. Extrusion molding and co-extrusion molding, for example, are the method comprising steps of pelletizing the above-mentioned material, melting and extruding the pellets into sheets. The formed body obtained by the above-mentioned molding method can be constructed with a signal layer or multiple layers.

The above-mentioned optically anisotropic body can be obtained by drawing a flat shape body formed from the above-mentioned material, preferably by drawing a layered body comprising a layer of thermoplastic resin having the above-mentioned positive intrinsic birefringence value and a layer of thermoplastic resin having the above-mentioned negative intrinsic birefringence value, more preferably by drawing a layered body comprising a layer of the above-mentioned norbornene resins and a layer of the above-mentioned polystyrene resins.

A method for effectively obtaining an optically anisotropic body having the above-mentioned wavelength dispersion characteristics and refraction index relationship is preferably a method which comprises steps of molding a material A comprising a thermoplastic resin having a positive intrinsic birefringence value and a retardation adjuster and a material B comprising a thermoplastic resin having a negative intrinsic birefringence value to give a layered body comprising a layer of material A and a layer of material B, and then drawing the layered body. More specifically, it is preferably a method comprising step of drawing a layered body that uses norbornene resin as a thermoplastic resin having a positive intrinsic birefringence value and polystyrene resin as a thermoplastic resin having a negative intrinsic birefringence value.

As drawing methods can be mentioned uniaxial drawing method such as uniaxial drawing in the transverse direction using a tenter drawing machine; biaxial drawing method such as simultaneous biaxial drawing where the fastening clip interval is opened to draw in the machine direction while at the same time the guide rail spreading angle is used to draw in the transverse direction, or a sequential biaxial drawing where the difference in peripheral speed between rolls is used to draw in the machine direction, before both side ends are held with clips in a tenter drawing machine to draw in the transverse direction; or an oblique drawing method that uses a tenter drawing machine that can apply a feed force, tensile force, or pulling force of differing speeds left and right in the transverse or machine direction, or a tenter drawing machine that can apply a feed force, tensile force, or pulling force of equal speeds left and right in the transverse or machine direction where the distances moved are the same and the drawing angle θ can be fixed or where the distances moved are different.

If the drawing conditions are such that the refraction index relationship is $n_x > n_y > n_z$, there are no restrictions in particular, but it is preferable that the drawing temperature is within the range between the glass transition temperature Tg of the material forming the optical anisotropic body (when multiple resins are used, the lowest glass transition temperature) and Tg+20° C., and that the draw ratio is in the range of 1.1 to 3.0.

The surface of the above-mentioned optically anisotropic body can be treated as required. Surface treatment methods can include glow discharge treatment, corona discharge treatment, ultraviolet light treatment, flame treatment and so on. The Surface treatment of the optically anisotropic body can improve adhesion with the light polarizer when the optically anisotropic body is used as a polarizer protective film for example.

The light polarizer used in the present invention is not limited in particular, and conventional polarizers in the public domain can be used. The light polarizers that can be used include iodine polarizers, dye polarizers using dichroic dyes, polyene polarizers and so on. In these light polarizers, for example, iodine polarizers can be manufactured by depositing iodine or dichroic dye on drawn film obtained by drawing polyvinyl alcohol film.

The liquid crystal display in the present invention comprises a liquid crystal cell, the above-mentioned optically anisotropic body positioned on one side of the liquid crystal cell, and a pair of light polarizers located on both sides of the liquid crystal cell. The pair of polarizers is composed of an incident side polarizer and an outgoing side polarizer positioned with the respective absorption axes perpendicular to each other. Note that the outgoing side polarizer refers to the polarizer on the viewer side of the liquid crystal display, and the incident side polarizer refers to the polarizer on the backlight side of the liquid crystal display.

A preferred embodiment of the liquid crystal display in the invention comprising the above-mentioned optically anisotropic body has either of two following arrangement (I) or (II). (I) This preferred embodiment has a single sheet of optically anisotropic body placed between the outgoing side polarizer and the liquid crystal cell in the liquid crystal display. (II) This preferred embodiment has a single sheet of optically anisotropic body placed between the incident side polarizer and the liquid crystal cell in the liquid crystal display.

In the above-mentioned preferred embodiments (I) or (II), it is preferable for the lag axis in the plane of the above-mentioned optically anisotropic body and the absorption axis of the light polarizer placed in the vicinity of the optically anisotropic body to be in a positional relationship that is nearly perpendicular. Placing these in such a position makes possible a contrast minimum value of 10 or more in the polar angle of 0 to 80°, which can effectively increase the visibility of the liquid crystal display screen, and can further improve the overall productivity of the display. Note that in the present invention the polar angle is the angle at a slant from the frontal direction from which the liquid crystal display screen is viewed. In addition, the angle created by 2 axes is the angle created by the planes forming the respective normal lines of the two axes. Further, the 2 axes being in a nearly perpendicular positional relationship means that the 2 axes form an angle of 87° to 90°.

It is preferable that the liquid crystal display of the present invention is a transparent type. In addition, as the display mode used in the liquid crystal display of the present invention may be mentioned in-plane switching mode, vertical alignment mode, hybrid alignment nematic mode, twisted nematic mode, super twisted nematic mode, optical compensated bend mode and so on. In these, vertical alignment mode is preferred. A vertical alignment mode liquid crystal display has a construction wherein the liquid crystal molecule long axis is parallel to a direction nearly vertical to transparent substrate in the state of no voltage applying to liquid crystal cell. As vertical alignment mode may be mentioned multi-domain vertical alignment mode, patterned vertical alignment mode, continuous pinwheel alignment mode and so on.

Generally, the vertical alignment mode uses liquid crystal molecules in a homeotropic alignment in the horizontal direction, an a pair of light polarizers wherein the absorption axes are in a perpendicular positional relationship each other and are in the vertical and horizontal directions in relation to the screen front, so the two absorption axes are in a positional relationship that appears to be perpendicular when viewing the screen from a slant in relation to the vertical and horizontal directions, which results in birefringence in the homeotropically aligned liquid crystal layer less than that in the twisted mode liquid crystal layer to obtain sufficient contrast. Contrary to this, when the screen is viewed from a slant in the direction of the 45° azimuthal angle, the appearance angle formed by the absorption axes in a pair of light polarizers is in a positional relationship offset from 90°, so birefringence occurs in the transmitted light, causing the light to leak, sufficient black not to be obtained, and the contrast to decline.

As describe above, placing a sheet of the optical anisotropic body of the present invention in a vertical alignment mode liquid crystal display can make it possible to "compensate for the phase difference that occurs in the liquid crystal molecule in the liquid crystal cell" and to "compensate for the light polarizer view angle."

This makes it possible to effectively compensate for the phase difference that occurs in the transmitted light to prevent the light from leaking and obtain a high contrast from all azimuthal angles, which makes it possible to suppress color shifting (the phenomenon where a dark display shows color when the display screen is viewed at a slant). In these effects, other mode liquid crystal displays can be considered to have the same effect, but the effects are especially remarkable in the vertical alignment mode.

In the liquid crystal display of the present invention, if the construction is such that the optically anisotropic body and the polarizer used in a liquid crystal display of the present invention are in contact, the optically anisotropic body can simultaneously serve as light polarizer protective film. Simultaneously using the optically anisotropic body as a light polarizer protective film makes it possible to omit the protective film layer to make the liquid crystal display thinner.

The liquid crystal display of the present invention has a backlight as a light source, and other parts including prism array sheet, lens array sheet, light diffuser plate, luminance enhancement film and so on may be placed in one, two, or more layers in appropriate positions.

The backlights that can be used for the liquid crystal display of the present invention include cold-cathode tubes, mercury flat lamps, light emitting diodes, electroluminescence and so on. And in these cold-cathode tubes are preferable.

EXAMPLE

The present invention is hereinafter explained in more detail while presenting EXAMPLES; however, the present invention is not limited to the following EXAMPLES.

A vertical alignment mode liquid crystal cell having a thickness of 2.74 μm, a positive dielectric anisotropy, a 550 nm wavelength birefringence an of 0.09884, and a pretilt angle of 90° for EXAMPLES and COMPARATIVE EXAMPLES.

The measurements and evaluations conducted in EXAMPLES and COMPARATIVE EXAMPLES are as follows.

(1) Thickness

An optically anisotropic body was embedded in epoxy resin, a microtome (RUB-2100) made by Yamato Kohki Industrial co., Ltd., was used to cut 0.05 μm slices of the optically anisotropic body, the cross-section of which were examined under a microscope and the thickness of the optically anisotropic body was measured.

(2) Refraction Index and Coefficient NZ

A high-speed spectroscopic ellipsometer (M-20000 made by J. A. Woollam Co., Ltd.) was used to find the direction of the in-plane lag axis of the optically anisotropic body at wavelength of 550 nm and to measure the in-plane lag axis direction refraction index $n_x$, refraction index $n_y$ of the direction perpendicular to the lag axis in the plane and thickness direction refraction index $n_z$, at 10 points equally spaced in the width direction of the optically anisotropic body, and the measurements average was taken. Further, the coefficient NZ was found using the following formula.

$$\text{Coefficient } NZ = (n_x - n_z)/(n_x - n_y)$$

(3) Frontal Direction Retardation Re (Re=$(n_x - n_y) \times d$)

A high-speed spectroscopic ellipsometer (M-2000U made by J. A. Woollam Co., Ltd.) was used for Re to be measured at 10 points equally spaced in the width direction of the optically anisotropic body within the wavelength range of 380 nm to 780 nm from which measurements the average value was calculated.

(4) Thickness Direction Retardation Rth (Rth=$[\{(n_x + n_y)/2\} - n_z] \times d$)

A high-speed spectroscopic ellipsometer (M-2000U made by J. A. Woollam Co., Ltd.) was used for Rth to be measured at 10 points equally spaced in the width direction of the optically anisotropic body at a wavelength of 550 nm from which measurements the average value was calculated.

(5) Glass Transition Temperature

This is measured using differential scanning calorimetry (DSC) based on JIS K 7121.

(6) Display Characteristics of the Liquid Crystal Display

The optically anisotropic body was placed in a position adjacent to a liquid crystal cell of a vertical alignment mode liquid crystal display and the display characteristics were observed at an azimuthal angle of 0° to 360° and a polar angle of 0° to 80°.

Good: No light leakage nor color shift in the display.

No good: Light leakage or color shift in the display.

In addition, a simulation for color shift occurring when no voltage is applied (dark display) was performed using a configuration of the EXAMPLES and COMPARATIVE EXAMPLES. At this time, the light leakage was evaluated for one of the color shift evaluation and shown in a luminance contour graph. In addition, the change in color was evaluated for another evaluation for color shift and shown in an xy chromaticity diagram for the azimuthal angle 0° to 360° and the polar angle 0° to 70°. Note that the 4×4 matrix method was used in the simulation.

In addition, to observe the variation in display characteristics for each production lot, 10 batches of the optically anisotropic body were produced and 10 units of the liquid crystal display using the optically anisotropic body obtained from each batch were fabricated for each batch. The display characteristics for the azimuthal angle 0° to 360° and the polar angle 0° to 80° were visually observed for all of the liquid crystal displays and the same good/no good evaluation as described above was performed.

Then the following determinations were made.

o: The number of liquid crystal displays with good display characteristics was 10 units Δ: The number of liquid crystal displays with good display characteristics was 7 to 9 units x: The number of liquid crystal displays with good display characteristics was 0 to 6 units Fabrication Example 1

50 mol % of monomer A (Chemical 2) and 50 mol % of monomer B (Chemical 3) having the structures shown below were dissolved in a sodium hydroxide aqueous solution and a small amount of hydrosulfite was added. Next, to this was added methylene chloride and then phosgene was blown in at 20° C. for 60 minutes. Then p-tert-butylphenol was added and emulsified. Triethylamine was added and then this was stirred at 30° C. for 3 hours to complete the reaction. After the reaction was completed, the organic phase was isolated and the methylene chloride was distilled out to obtain a polycarbonate copolymer.

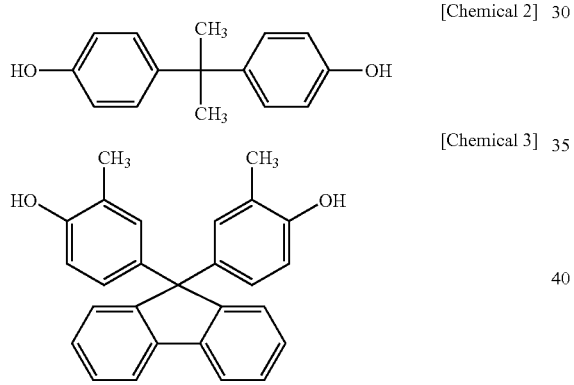

[Chemical 2]

[Chemical 3]

Example 1

Optically Anisotropic Body A1

An undrawn layered body comprising a layer [1] comprising 6 parts by weight of 2,2-methylenebis(4-(1,1,3,3-tetramethylbutyl)-6-(2H-benzotriazole-2-yl) phenol) [ADEKASTAB LA-31 made by ASAHI DENKA Co., Ltd] as an ultraviolet light absorption agent exhibiting dichroism, and 100 parts by weight of norbornene resin [ZEONOR 1420R made by Zeon Corporation, glass transition temperature of 136° C.], a layer [2] comprising a copolymer of styrene and maleic anhydride [glass transition temperature of 130° C.], and a layer [3] comprising a denatured copolymer of ethylene and vinyl acetate [Vicat softening point 80° C.] and having the structure of layer [1] (100 μm)-layer [3] (7 μm)-layer [2] (50 μm)-layer [3] (7 μm)-layer [1] (100 μm) was obtained using co-extrusion molding.

The undrawn layered body was uniaxial drawn in the machine direction at a temperature of 140° C. and a drawing ratio of 1.5 with a drawing machine using the float system between rolls. Next, this was uniaxial drawn in the transverse direction at a temperature of 140° C. and a drawing ratio of 2 in a drawing machine using the tenter method to obtain an optically anisotropic body (A1).

The obtained optically anisotropic body (A1) measured at a wavelength of 550 nm had Re of 64 nm, Rth of 229 nm, coefficient NZ of 4.1, and satisfied the relationship of $n_x > n_y > n_z$. In addition, the Re in the wavelength range of 380 nm to 780 nm is as shown in FIG. 1, with there exists a local minimal value for Re at a wavelength of 435 nm and the frontal direction retardation for the respective directions from the wavelength 435 nm to the short wavelength side and long wavelength side was monotonously increased.

Comparative Example 1

Optically Anisotropic Body B1

This is obtained by extrusion molding 100 μm thick undrawn film of norbornene resin [ZEONOR 1420R made by Zeon Corporation]. The undrawn film was uniaxial drawn in the machine direction at a temperature of 140° C. and a drawing ratio of 1.5 in a drawing machine using the float system between rolls, and then it was uniaxial drawn in the transverse direction at a temperature of 140° C. and a drawing ratio of 1.6 in a drawing machine using the tenter method to obtain the optically anisotropic body (B1).

The obtained optically anisotropic body (B1) measured at a wavelength of 550 nm had Re of 67 nm, Rth of 218 nm, coefficient NZ of 3.7, and satisfied the relationship of $n_x > n_y > n_z$.

In addition, the Re in the wavelength range of 380 nm to 780 nm is as shown in FIG. 2, and there was no characteristic wavelength where the frontal direction retardation for the respective directions from the characteristics wavelength to the short wavelength side and long wavelength side was monotonously increased (a frontal direction retardation local minimal value did not exist).

Comparative Example 2

Fabrication of Optically Anisotropic Body B2

A mixture of 75% by weight of polystyrene being a resin having a negative intrinsic birefringence value, and 25% by weight of polyphenylene oxide (poly (2,6-dimethyl-1,4-phenylene oxide) was dissolved in chloroform to create a dope solution, and a 100 μm thick undrawn film was obtained by solution casting method. This undrawn film was uniaxial drawn in the machine direction at a temperature of 150° C. and a drawing ratio of 0.2 in a drawing machine using the float system between rolls, and then it was uniaxial drawn in the transverse direction at a temperature of 150° C. and a drawing ratio of 2.5 in a drawing machine using the tenter method to obtain the optically anisotropic body (B2).

The obtained optically anisotropic body (B2) measured at a wavelength of 550 nm had an Re of 67 nm, Rth of 220 μm, coefficient NZ of 3.8, and satisfied the relationship of $n_x > n_y > n_z$.

In addition, the Re in the wavelength range of 380 nm to 780 nm is as shown in FIG. 3, and there was no characteristic wavelength where the frontal direction retardation for the respective directions from the characteristics wavelength to the short wavelength side and long wavelength side was monotonously increased (a frontal direction retardation local minimal value did not exist).

Comparative Example 3

Fabrication of Optically Anisotropic Body B3

This is obtained by extrusion molding 100 μm thick undrawn film of polycarbonate copolymer made in the Fabrication Example 1. This undrawn film was uniaxial drawn in the machine direction at a temperature of 210° C. and a drawing ratio of 2 in a drawing machine using the float method between rolls, and then it was uniaxial drawn in the transverse direction at a temperature of 210° C. and a drawing ratio of 2.5 in a drawing machine using the tenter method to obtain the optically anisotropic body (B3).

The obtained optically anisotropic body (B3) measured at a wavelength of 550 nm had Re of 67 nm, Rth of 219 nm, coefficient NZ of 3.8, and satisfied the relationship of $n_x > n_y > n_z$.

In addition, the Re in the wavelength range of 380 nm to 780 nm is as shown in FIG. 4, and there was no characteristic wavelength where the frontal direction retardation for the respective directions from the characteristics wavelength to the short wavelength side and long wavelength side was monotonously increased (a frontal direction retardation local minimal value did not exist).

Comparative Example 4

Fabrication of Optically Anisotropic Body B4

An undrawn layered body comprising a layer [1] comprising a norbornene resin [ZEONOR 1420R made by Zeon Corporation] compound at the ratio of 4 parts by weight of the ultraviolet light absorption agent to 100 parts by weight of the resin, a layer [2] comprising a copolymer of styrene and maleic anhydride [glass transition temperature 130° C.], and a layer [3] comprising a denatured copolymer of ethylene and vinyl acetate [Vicat softening point 80° C.] and having the structure or layer [1] (75 μm)-layer [3] (7 μm)-layer [2] (100 μm)-layer [3] (7 μm)-layer [1] (75 μm) was obtained using co-extrusion molding.

This undrawn layered body was uniaxial drawn in the machine direction at a temperature of 140° C. and a drawing ratio of 1.5 in a drawing machine [UTM-10TPL made by Toyo Baldwin Co. Ltd.] to obtain the optically anisotropic body (B4).

The obtained optically anisotropic body (B4) measured at a wavelength of 550 nm had Re of 64 nm, Rth of 32 nm, coefficient NZ of 1, and satisfied the relationship of $n_x > n_y = n_z$. In addition, Re in the wavelength range of 380 nm to 780 mm is as shown in FIG. 5, with there existing 1 local minimal value for Re at a wavelength of 435 nm and the frontal direction retardation for the respective directions from the wavelength 435 nm to the short wavelength side and long wavelength side was monotonously increased.

Fabrication Example 2

Fabrication of the Light Polarizer

A 75 μm polyvinyl alcohol film is allowed to soak for 2 minutes in an aqueous solution containing 0.01 parts by weight of iodine and 2 parts by weight of potassium iodide per 100 parts by weight of water, respectively, at 30° C. while being drawn at a drawing ratio of 3. Next, the film is allowed to soak in an aqueous solution containing 5 parts by weight of boric acid and 3 parts by weight of potassium iodide, respectively, in 100 parts by weight of water at 60° C. for 5 minutes. Then the film is washed with pure water for 10 seconds and allowed to dry at 50° C. for 6 minutes to obtain the light polarizer.

Fabrication Example 3

Fabrication of the Light Polarizing Plate

80 μm thick triacetyl cellulose film surface treated though saponification was affixed to one side of the light polarizer obtained in Fabrication Example 2 using adhesive, and the optically anisotropic body obtained in the EXAMPLE 1 and COMPARATIVE EXAMPLES 1 to 4 was affixed to the other side of the light polarizer using adhesive to obtain polarizing plate A1 and polarizing plates B1 to B4. At this time the absorption axis of the light polarizer and the lag axis of the optically anisotropic body were made to intersect perpendicularly.

Example 2 and Comparative Examples 5 to 8

Fabrication of Liquid Crystal Displays

The incident side polarizing plate of the vertical alignment mode liquid crystal display [TL3004FM made by TECO] was replaced with the polarizing plate obtained in Fabrication Example 3 to obtain liquid crystal display A1 and liquid crystal displays B1 to B4. At this time, the optically anisotropic body affixed to the light polarizer is positioned at the side of the liquid crystal cell, and further, a liquid crystal display having the configuration shown in FIG. 6 is assembled so that the absorption axis of the polarizing plate obtained in Fabrication Example 3 is perpendicular to the absorption axis of the incident side polarizing plate (Note that the arrows in the figure show the direction of the polarizing plate absorption axis and the direction of the optically anisotropic body lag axis). The evaluation results for the visual evaluation conducted for the display characteristics of the obtained liquid crystal display are shown in Table 1. In addition, contour graphs are shown in FIG. 7 and FIG. 8 to 11, and xy chromaticity diagrams are shown in FIG. 12 and FIG. 13 to 16 for the results obtained from simulations for liquid crystal display A1 and liquid crystal displays B1 to B4. Note that in the xy chromaticity diagrams the black dot is the chromatic coordinate point for when observing the screen from the frontal direction.

Note that in the contour graphs show the "screen luminance/light source luminance" when no voltage is applied as a dimensionless value. The smaller this value is, the less light leakage there is from the screen. Further, in the xy chromaticity diagrams, the colors observed from directions in relation to the screen when no voltage is applied are plotted, and this plotting shows the path when performed within the azimuthal angle 0° to 360° and polar angle 0° to 70° ranges. This path shows that the farther away a point is from the chromatic coordinate point when seen as viewed from the frontal direction of the screen, the greater is the screen color shift.

In addition, the results of the display characteristic differences observed between fabrications are shown in Table 1.

TABLE 1

|  | Optically Anisotropic Body | Polarizing Plate | Liquid Crystal Display | Display Characteristics of Liquid Crystal Display | Difference in Display Characteristics Among Fabrications |
|---|---|---|---|---|---|
| EXAMPLE 2 | A1 | A1 | A1 | Good | ○ |
| COMPARATIVE EXAMPLE 5 | B1 | B1 | B1 | No good | x |
| COMPARATIVE EXAMPLE 6 | B2 | B2 | B2 | No good | x |
| COMPARATIVE EXAMPLE 7 | B3 | B3 | B3 | No good | x |
| COMPARATIVE EXAMPLE 8 | B4 | B4 | B4 | No good | x |

The following can be understood from the results in Table 1 and from FIG. 7 to 16.

The liquid crystal display A1 of the EXAMPLE 2 showed no light leakage or false colors (color shifts) in the screen and excellent visibility. In addition, the liquid crystal display A1 of the EXAMPLE 2 has good display characteristics for the optical properties of the optically anisotropic body despite some variation between fabrications.

In comparison to this, the liquid crystal display B1 of the Comparative Example 5 showed great light leakage when observed in particular from the azimuthal angles of 60°, 120°, 240°, and 300° and the polar angle of 70°. Further, the color shift varied greatly depending on the direction from which the screen was observed. In addition, the liquid crystal display B1 of the Comparative Example 5 had variation between fabrications and the display characteristics for the optical properties of the optically anisotropic body were not good.

Also, the liquid crystal display B2 of the Comparative Example 6 showed little light leakage from the screen, but the color shift was very large depending on the direction from which the screen was observed. In addition, the liquid crystal display B2 of the Comparative Example 6 had variation between fabrications and the display characteristics for the optical properties of the optically anisotropic body were not good.

The liquid crystal display B3 of the Comparative Example 7 showed very great light leakage when observed in particular from the azimuthal angles of 45°, 135°, 225°, and 315°. Further, the color shift varied greatly depending on the direction from which the screen was observed. In addition, the liquid crystal display B3 of the Comparative Example 7 had variation between fabrications and the display characteristics for the optical properties of the optically anisotropic body were not good.

The liquid crystal display B4 of the Comparative Example 8 showed great light leakage when observed in particular from the azimuthal angles of 45°, 135°, 225°, and 315°. Further, the color shift varied much depending on the direction from which the screen was observed. In addition, the liquid crystal display B4 of the Comparative Example 8 had variation between fabrications and the display characteristics for the optical properties of the optically anisotropic body were not good.

What is claimed:

1. A liquid crystal display comprising: a liquid crystal cell, a sheet-shaped optically anisotropic body placed on one side of the liquid crystal cell, and a pair of light polarizers located on both sides of the liquid crystal cell, wherein the optically anisotropic body satisfies the relationship of $n_x > n_y > n_z$ at wavelength of 550 nm, where $n_x$ is in-plane refraction index of lag axis direction, $n_y$ is refraction index of the direction perpendicular to the lag axis in the plane, and $n_z$ is retraction index of the thickness direction; and has a local minimal value in wavelength range of 380 to 490 nm and monotonous increase in both the short wavelength and long wavelength directions from the wavelength that shows the local minimal value, in wavelength characteristics of frontal direction retardation for light in wavelength range of 380 to 780 nm.

2. The liquid crystal display according to claim 1, wherein the liquid crystal cell is a vertical alignment mode cell.

3. The liquid crystal display according to claim 1, wherein the optically anisotropic body is a drawn flat shaped body comprising thermoplastic resin.

4. The liquid crystal display according to claim 1, wherein the optically anisotropic body has an average value of 40 to 100 nm in a frontal direction retardation at wavelength of 550 nm.

5. The liquid crystal display according to claim 1, wherein the optically anisotropic body has an average value of 100 to 400 nm in a thickness direction retardation at wavelength of 550 nm.

6. The liquid crystal display according to claim 1, wherein the optically anisotropic body has coefficient NZ of 2 to 8 at wavelength of 550 nm.

7. The liquid crystal display according to claim 1, wherein the optically anisotropic body is made of a material comprising a retardation adjuster.

8. The liquid crystal display according to claim 1, wherein the optically anisotropic body is manufactured by dining of a layered body which has a layer comprising as a main ingredient thermoplastic resin having a positive intrinsic birefringence value and a layer comprising as a main ingredient thermoplastic resin having a negative intrinsic birefringence value.

9. The liquid crystal display according to claim 1, wherein the optically anisotropic body is placed between the light polarizer on the incident side and the liquid crystal cell.

10. The liquid crystal display according to claim 1, wherein the lag axis in the plane of the optically anisotropic body and the absorption axis of the light polarizer placed in the vicinity of the optically anisotropic body are in a positional relationship that is nearly perpendicular.

11. The liquid crystal play according to claim 1, wherein the liquid crystal display is a transparent type display.

12. An optically anisotropic body which
satisfies the relationship of $n_x > n_y > n_z$ at wavelength of 550 nm where $n_x$ is in-plane refraction index of lag axis direction, $n_y$ is refraction index of the direction perpendicular to the lag axis in the plane, and $n_z$ is refraction index of the thickness direction; and
has a local minimal value in wavelength range of 380 to 490 nm and monotonous increase in both the short wavelength and long wavelength directions from the wavelength that shows the local minimal value, in wavelength characteristics of frontal direction retardation for light in wavelength range or 380 to 780 nm.

* * * * *